United States Patent
Hoyt (10) Patent No.: US 11,572,116 B2
(45) Date of Patent: Feb. 7, 2023

(54) TRACK ADJUST MONITOR

(71) Applicant: Caterpillar Inc., Peoria, IL (US)

(72) Inventor: Daniel Wilson Hoyt, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 455 days.

(21) Appl. No.: 16/811,797

(22) Filed: Mar. 6, 2020

(65) Prior Publication Data

US 2021/0276640 A1    Sep. 9, 2021

(51) Int. Cl.
*B62D 55/30* (2006.01)
*B62D 55/20* (2006.01)
*B62D 55/32* (2006.01)

(52) U.S. Cl.
CPC ............ *B62D 55/30* (2013.01); *B62D 55/20* (2013.01); *B62D 55/32* (2013.01)

(58) Field of Classification Search
CPC ................................ B62D 55/30; B62D 55/32
See application file for complete search history.

(56) References Cited

U.S. PATENT DOCUMENTS

| | | | |
|---|---|---|---|
| 3,409,335 A | 11/1968 | Piepho et al. | |
| 4,881,786 A * | 11/1989 | Tonsor | B62D 55/30 305/153 |
| 5,511,868 A * | 4/1996 | Eftefield | B62D 55/30 305/148 |
| 6,024,183 A * | 2/2000 | Dietz | B62D 55/30 180/9.1 |
| 6,431,665 B1 * | 8/2002 | Banerjee | B62D 55/30 180/9.1 |
| 6,682,155 B2 * | 1/2004 | Hoff | B62D 55/30 305/148 |
| 7,172,257 B2 | 2/2007 | Tamaru et al. | |
| 10,099,735 B2 | 10/2018 | Vik et al. | |
| 10,300,968 B2 | 5/2019 | Jiang et al. | |
| 2002/0156574 A1 | 10/2002 | Fortin | |
| 2016/0311481 A1 * | 10/2016 | Grant | B62D 55/30 |
| 2017/0356164 A1 | 12/2017 | Recker et al. | |
| 2018/0190045 A1 | 7/2018 | Richard et al. | |

\* cited by examiner

*Primary Examiner* — Tony H Winner (57) ABSTRACT

A work machine includes a frame assembly supporting an idler and a drive sprocket. A track is looped around the idler and the drive sprocket. A track-adjust mechanism is configured to extend and to retract the frame assembly to adjust a tension of the track. A position sensor is configured to measure an extension of the track-adjust mechanism. A controller is configured to receive an extension measurement from the position sensor, determine a track tension based on the extension measurement, and output a track tension signal.

20 Claims, 6 Drawing Sheets

TRACK ADJUST MONITOR

TECHNICAL FIELD

The present disclosure generally relates to track work machines having a drive track, and more particularly, relates to a track adjustment monitor for a drive track of a work machine.

BACKGROUND

Work machines often include an undercarriage assembly having a track to propel the work machine about a work site. The track includes a plurality of interconnected linkages that form a continuous loop. The track extends around a plurality of rollers and idlers and is driven by a drive sprocket to rotate the track. The work machines may include a plurality of tracks, for example a left-side track and a right-side track, each capable of receiving drive inputs from separate drive sprockets to maneuver the work machine about the work site.

The undercarriage assembly further serves as a suspension system to provide for proper absorption of shocks to the remainder of the work machine, and may further include a track-adjust mechanism to extend and retract a frame assembly and a recoil assembly. The operation of the track-adjust mechanism and the recoil assembly affects the tension of the track on the work machine.

Maintaining a proper track tension is one factor to extending an operational life of the work machine and to ensure proper operation of the work machine. Varying factors can affect the track tension, from wear of components to debris being stuck within the track and roller assemblies.

Typically, monitoring the track tension is a manual procedure, performed by an operator. However, the operators require training in order to properly assess the track tension. Further, periodic assessment of the track tension may not occur as regularly as desired.

U.S. Pat. No. 6,276,768 describes a track tensioning assembly for adjusting tension on a drive track chain on the undercarriage assembly of a work machine. The undercarriage assembly also includes a first hydraulic actuator mechanically coupled to the first drive track chain to adjust tension on the first drive track chain and a second hydraulic actuator mechanically coupled to the second drive track chain to adjust tension on the second drive track chain. The undercarriage assembly further includes a slack adjuster assembly. The slack adjuster assembly has (i) an adjuster housing defining (a) a main chamber, (b) a fluid inlet, (c) a first fluid outlet which is fluidly coupled to the first hydraulic actuator, and (d) a second fluid outlet which is fluidly coupled to the second hydraulic actuator, (ii) a first piston positioned in the main chamber, the first piston selectively couples the fluid inlet to the first fluid outlet, and (iii) a second piston positioned in the main chamber, the second piston selectively couples the fluid inlet to the second fluid outlet.

While effective, there is still a need for improved or alternative strategies for monitoring track tension of a work machine.

SUMMARY

In accordance with one aspect of the present disclosure, a work machine includes a frame assembly to support an idler and a drive sprocket. A track is looped around the idler and the drive sprocket. A track-adjust mechanism is configured to extend and to retract the frame assembly to adjust a tension of the track. A position sensor is configured to measure an extension of the track-adjust mechanism. A controller is configured to receive an extension measurement from the position sensor, determine a track tension based on the extension measurement, and output a track tension signal.

In another embodiment, a work machine includes a frame assembly supporting an idler and a drive sprocket, a track looped around the idler and the drive sprocket, and a track-adjust mechanism configured to extend and to retract the frame assembly to adjust a tension of the track. A recoil system, or a recoil assembly, having a recoil spring is included to bias against the track-adjust mechanism. A spring tension sensor is configured to measure a spring tension of the recoil spring. Further, a controller is configured to receive a spring tension measurement from the spring tension sensor, determine a track tension based on the spring tension measurement, and output a track tension signal.

In yet another embodiment a track monitoring system for a work machine having a track is provided for. The track monitoring system includes a controller configured to receive a position measurement indicative of an extension of a track-adjust mechanism that extends and retracts a frame assembly to adjust a tension of the track, determine a track tension of the track based on the received extension measurement, and output a track tension signal.

These and other aspects and features of the present disclosure will be more readily understood when read in conjunction with the accompanying drawings.

DETAILED DESCRIPTION

Figure 1:
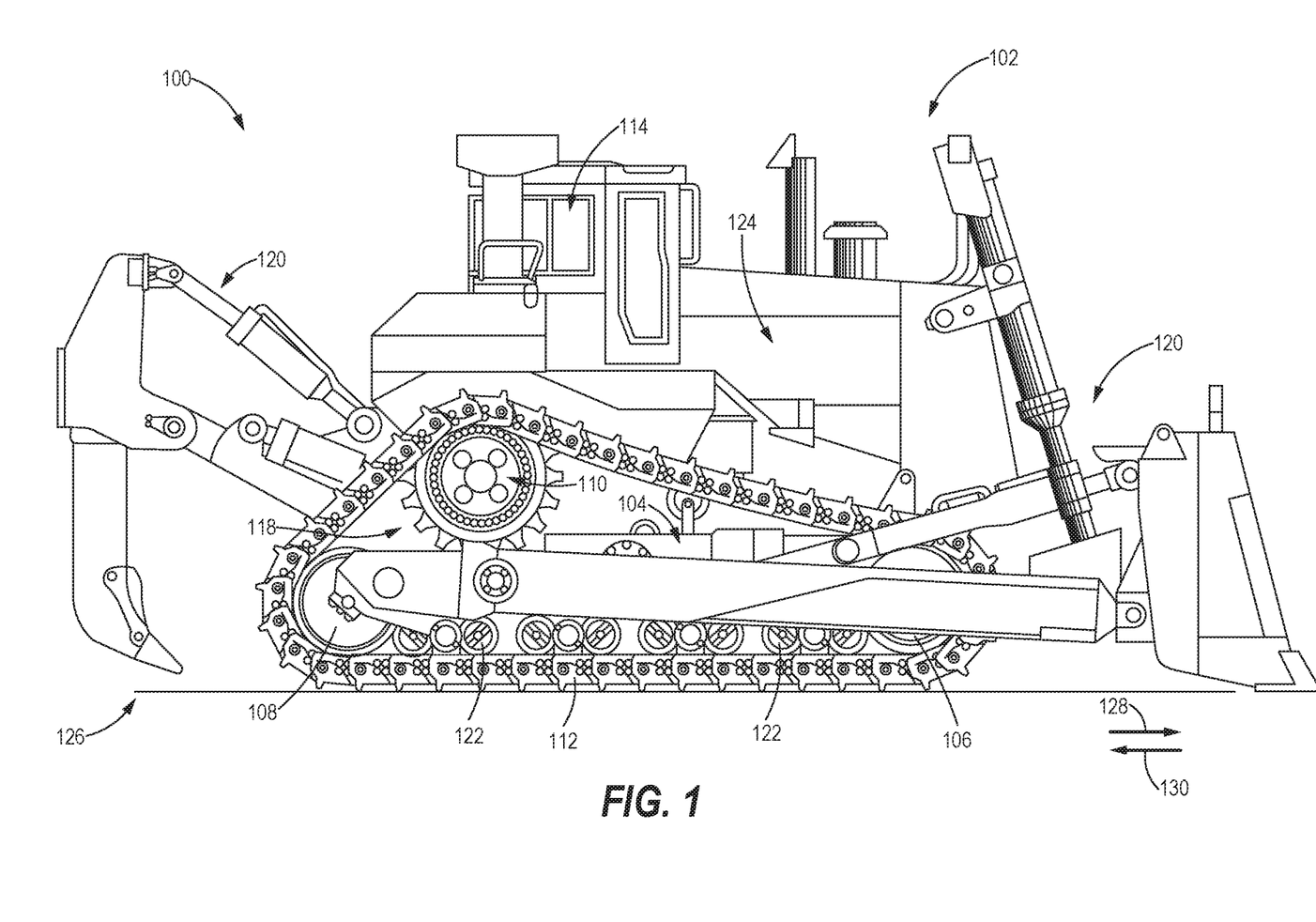
FIG. 1 is a side elevation view of a work machine, in accordance with an embodiment of the present disclosure.

Referring now to the drawings, and with specific reference to FIG. 1 of a work machine in accordance with an embodiment of the present disclosure, is generally referred to by reference numeral 102. While the work machine 102 depicted is a track type tractor, it is be understood any number of types of track driven work machines, including but not limited to, excavators, cold planers, loaders, dozers, forestry machines, mining machines, and the like can include the teachings of the present disclosure with equal efficacy.

In particular, FIG. 1 depicts the side elevation view 100 of the work machine 102. The work machine 102 may be employed to perform a variety of functions such as earth moving and ripping. The work machine 102 includes a plurality of work implements 120, depicted as an exemplary hydraulically-powered ripper on the rear of the work machine 102 and a blade assembly on the front of the work machine 102. However, various other work implements 120 may be utilized without deviating from the scope of the present disclosure.

The work machine 102 may include an engine 124, which may be realized as a diesel engine, a spark ignition engine, a liquid natural gas engine, an electric engine, or the like. The engine 124 serves as a source of power for the various systems (e.g., hydraulic, auxiliary electric) of the work machine and also provide for propulsion.

The work machine 102 further includes an undercarriage assembly 118. The undercarriage assembly 118 includes a frame assembly 104, a drive sprocket 110, a front idler wheel 106, a rear idler wheel 108, and a plurality of roller assemblies 122. A track 112 is looped around the idlers 106, 108 and the drive sprocket 110. The drive sprocket 110 drives the track 112 around the front idler wheel 106, the rear idler wheel 108, and the plurality of roller assemblies 122 to provide a motive power for the work machine 102. In particular, the mechanical output of the engine 124 is transmitted to the drive sprocket 110 via a transmission assembly (not shown) thereby driving the drive sprocket 110 to advance the track 112. The work machine 102 is depicted on a ground surface 126 and for reference, the work machine 102 may be propelled in a forward direction 128 or a reverse direction 130 by selective rotation of the drive sprocket 110. It should be noted that the right-side of the work machine 102 is depicted in the view 100, and that a work machine 102 may include a similar undercarriage assembly 118 on the left-side of the work machine 102.

The work machine 102 further includes an operator station 114. The operator station 114 is provided to enclose or otherwise house the devices associated with the work machine 102, although certainly a non-enclosed operator station 114 may be utilized. The operator station 114 may include a seat for an operator, controls to operate the work machine 102, displays and indications to inform the operator of the status of the work machine, and the like. In other embodiments, the work machine 102 is a remotely operated or autonomous work machine. In such embodiments, the work machine 102 may not include an operator station on the work machine, but a remote operator station or control station. The remote operator station may be communicatively coupled to the work machine via a wired or wireless network and be able to receive status updates regarding operations of the work machine 102.

Figure 2:
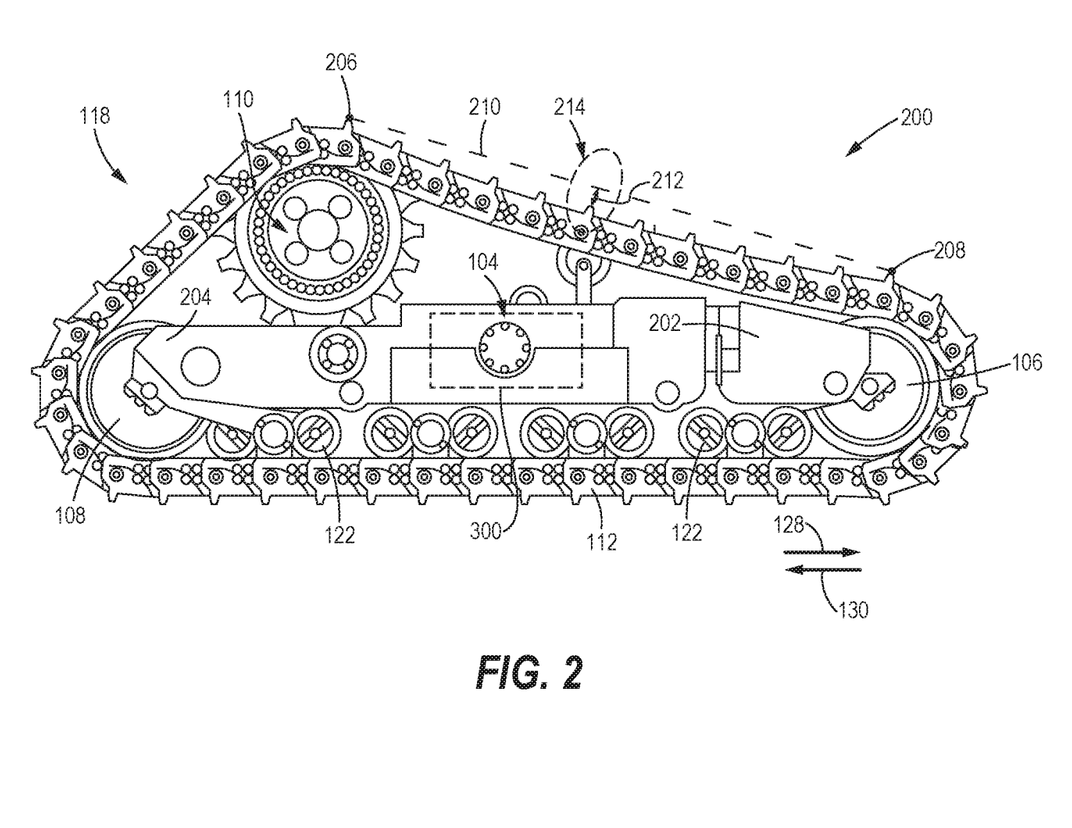
FIG. 2 is an enlarged side elevation view of the undercarriage assembly of the work machine of FIG. 1, in accordance with an embodiment of the present disclosure.

FIG. 2 is an enlarged side elevation view of the undercarriage assembly of the work machine of FIG. 1, in accordance with an embodiment of the present disclosure. In particular, FIG. 2 depicts the side elevation view 200 of the undercarriage assembly 118 of the work machine 102 from FIG. 1. The frame assembly 104 includes a front member 202 and a rear member 204. The front member 202 is able to move relative to the rear member 204, in directions parallel to the forward direction 128 and the reverse direction 130, based on operations of a track-adjust mechanism 322 and the recoil assembly 302, discussed more in detail below. The track-adjust mechanism 322 may set a nominal tension of the track 112, but under operation of the work machine 102, the track-adjust mechanism 322 and the recoil assembly 302 may work in tandem to adjust the tension of the track 112. Various operational conditions, such as dirt packing, mode of the drive train, slope of the ground surface, and the like, may cause the track tension to vary. In brief, extension and retraction of the track-adjust mechanism 322, as well as extension and retraction of the recoil assembly 302, causes the frame assembly 104 to extend and to retract to adjust the tension of the track 112.

In some embodiments, the track-adjust mechanism 322 is realized by a hydraulic cylinder, and may be referred to as a track-adjust cylinder. In other embodiments, the track-adjust mechanism is either one of an electric or a mechanical linear actuator configured to extend and retract to adjust the track tension.

The front idler wheel 106 is supported by the front member 202 and the rear idler wheel 108 is similarly supported by the rear member 204. The drive sprocket 110 may be similarly fixed to either one of the front member 202 or the rear member 204. As it is depicted in FIG. 2, the drive sprocket 110 is fixed and supported by the rear member 204. The track 112 is looped around the front idler wheel 106, the rear idler wheel 108, and the drive sprocket 110, as well as the roller assemblies 122.

The view 200 includes reference points 206 and 208, and a reference line 210 that extends between these reference points. At area 214, it is visible that the track 112 sags, as indicated by the distance 212 between the track 112 and the reference line 210. With an increased track tension (e.g., by extending the track-adjust mechanism 322 and moving the front member 202 apart from the rear member 204) the distance 212 will become smaller. Conversely, with a decreased track tension (e.g., by retracting the track-adjust mechanism 322 and moving the front member 202 closer to the rear member 204), the distance 212 will become larger.

Figure 3:
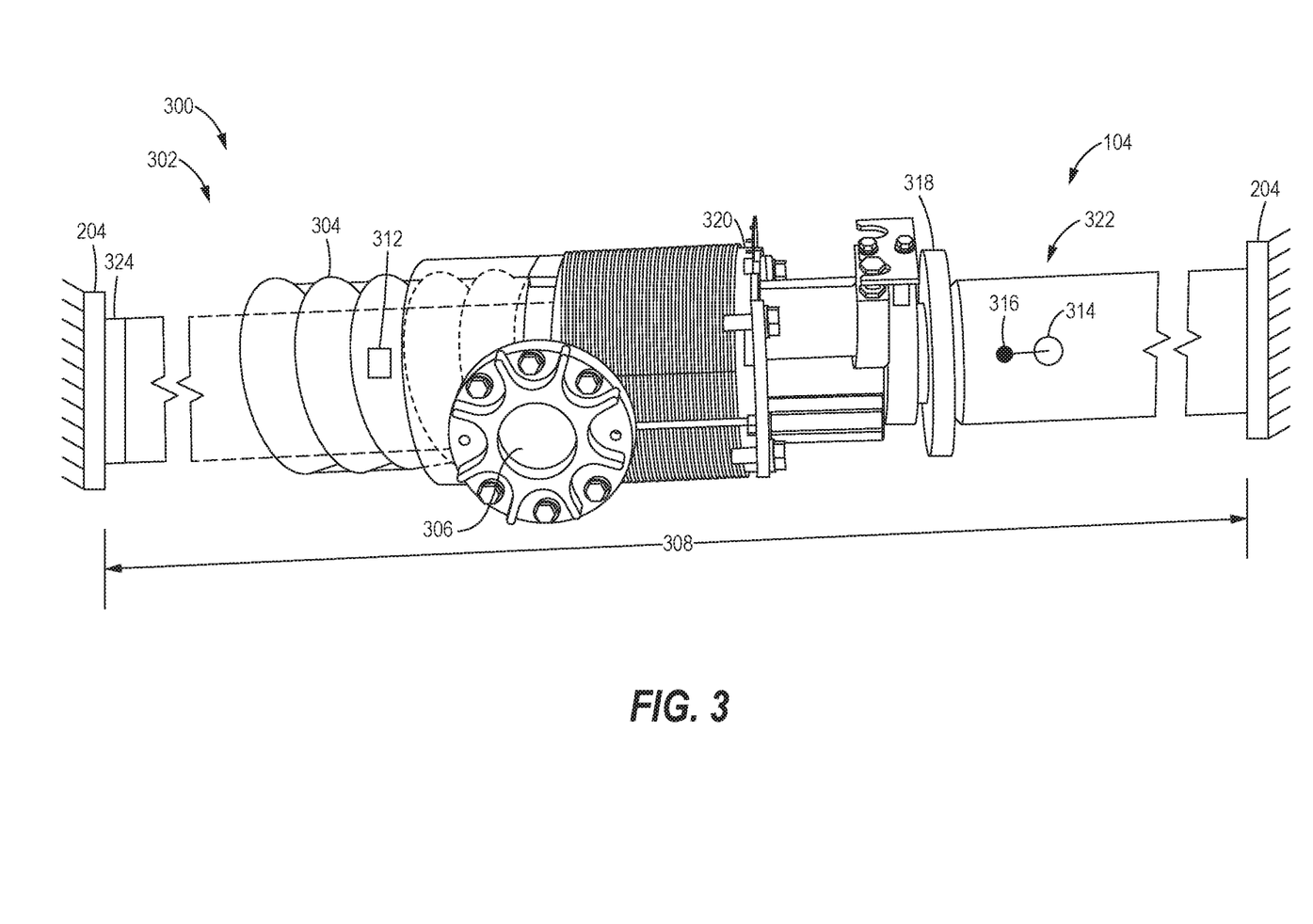
FIG. 3 is an internal view of a portion of the frame assembly of FIG. 2, in accordance with an embodiment of the present disclosure.

FIG. 3 is an internal view of a portion of the frame assembly of FIG. 2, in accordance with an embodiment of the present disclosure. In particular, FIG. 3 depicts the internal view 300 of a portion of the frame assembly 104. The portion of the frame assembly 104 is oriented the same as depicted in the views 100 and 200 of FIGS. 1 and 2, respectively, with the front member 202 being located on the right side and the rear member 204 being located on the left side of the view 300. The track-adjust mechanism 322 is configured to extend and retract to change an extension 308 between a fixed portion of the front member 202 and a fixed portion of the rear member 204. A position sensor 310 may be configured to measure the extension 308 of the track-adjust mechanism 322. Although various position sensors 310 are described herein, the position sensor 310 measures a distance between a fixed portion of the front member 202 and a fixed portion of the rear member 204. For example, the track-adjust mechanism 322 may include a front flange 318 and a rear flange 320 that move relative to each other upon extension and retraction of the track-adjust mechanism 322. Thus, measuring a distance between the front flange 318 and the rear flange 320 provides an indication of the extension 308.

In some embodiments, the track-adjust mechanism 322 is a hydraulically operated cylinder. In such embodiments, a working pressure of the track-adjust mechanism 322 may be obtained. For example, a pressure sensor 314 may be affixed to an access port 316 that is fluidly connected to the hydraulic fluid within the track-adjust mechanism 322.

In some embodiments, the frame assembly 104 includes a recoil assembly 302. The recoil assembly 302 includes a recoil spring 304 is under tension and is positioned to bias a portion of the track-adjust mechanism 322 away from the rear member 204. The recoil spring 304 is positioned such that it exerts a force against the rear member 204 and a portion of the track-adjust mechanism 322, such as the rear flange 320. The recoil spring 304 may thus be under a compression force and exert opposing forces towards the rear member 204 and the rear flange 320. In some embodiments, a recoil assembly tension sensor 312 is configured to measure a recoil assembly tension. The recoil assembly tension sensor 312 may be realized as a strain gage disposed on the recoil spring. In other embodiments, the recoil assembly tension sensor 312 may be realized as a load sensor 324 that is disposed between the recoil spring 304, or similar component, and the frame assembly 104 such that the load sensor is able to measure the force exerted by the recoil spring 304. As depicted in the view 300, the load sensor 324 is disposed between the rear member 204 and the recoil spring 304. Further, strain gages on the recoil spring 304 or on the track-adjust mechanism 322 may further be configured to serve as the load sensor 324. Such strain gages are calibrated to determine an axial load on either one of the recoil spring 304 or the track-adjust mechanism 322 to determine a load.

In other embodiments, the recoil assembly 302 may be a gas-compressed cylinder, or it may include a compressed gas cylinder operating in parallel or series with a recoil spring to adjust the track tension. The recoil assembly 302 may act similar to the recoil spring 304 and may further include a recoil assembly tension sensor that is configure to measure a recoil assembly tension, similar to the recoil spring tension.

The recoil assembly 302 may further include a twist resistor 306 to adjust a tension of the recoil spring 304. The front member 202 of the frame assembly 104 is able to move relative to the rear member 204 of the frame assembly 104. The twist resistor 306 serves to constrain a rotational degree of freedom so that either the front member 202 or the rear member 204 does not rotate relative to each other. The twist resistor 306 may include a key and rail system that a portion of the front member 202 slides along relative to the rear member 204. In some embodiments, overextension of the track-adjust mechanism 322 may cause increased wear or damage to the twist resistor 306 by preventing the key and rail system from properly engaging.

Figure 4:
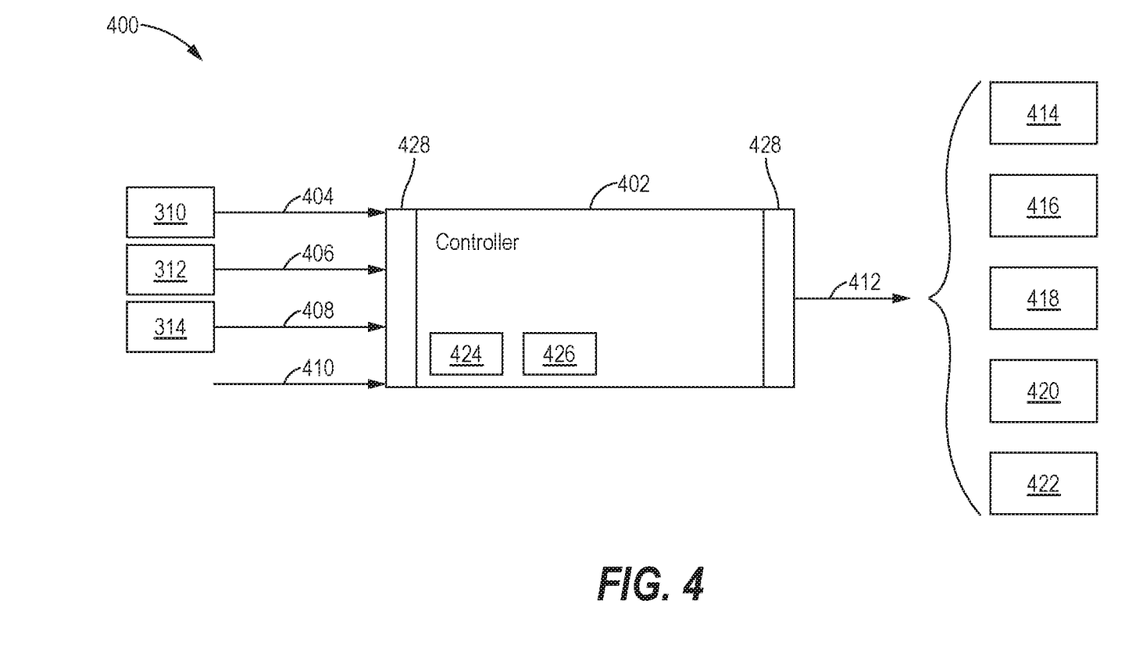
FIG. 4 is a block diagram of a track monitoring system, in accordance with an embodiment of the present disclosure.

FIG. 4 is a block diagram of a track monitoring system, in accordance with an embodiment of the present disclosure. In particular, FIG. 4 depicts components of the track monitoring system 400 and includes a controller 402. The controller 402 is configured to receive, from the position sensor 310, an extension measurement; from the recoil assembly tension sensor 312 a recoil assembly tension measurement 406; and from the pressure sensor 314 a track-adjust mechanism pressure measurement 408. The controller 402 may further receive a drive signal 410. The drive signal 410 is indicative of the drive sprocket 110 being rotated to cause the work machine 102 to proceed in a forward or a reverse direction.

The controller 402 is programmed to determine a track tension based in part on the received measurements. For example, the track tension may be based on any one of the extension measurement 404, the recoil assembly tension measurement 406, and the track-adjust mechanism pressure measurement 408. In some embodiments, the track tension is based on a one or more of the measurements. For a given circumferential measurement of the track 112, an extension 308 of a track-adjust mechanism may be related to a track tension. Further, the track-adjust mechanism pressure measurement 408 and the recoil assembly tension measurement 406 may also both be related to the track tension as they both indicate the relative force being applied to the frame assembly 104 to separate the front member 202 from the rear member 204.

The controller 402 may be realized by electrical components commonly found in other work machine controllers and may include a microprocessor 424, a memory device 426, and an interface circuit 428. The interface circuit 428 is configured to receive the various signals (e.g., measurements 404-408, and drive signals 410), and is further configured to output signals (e.g., a track tension signal 412) to various devices. As depicted in FIG. 4, the various output devices may include an operator display 414, a wireless communication device 416, a diagnostic code reader 418, a warning light 420, and a Short Message Service (SMS) interface 422, and the like. For example, the interface circuit 428 may output the track tension signal 412 to the operator display 414 to display a track tension indication. In another example, the track tension signal may be output via the wireless communication device 416 to a remote user. In some embodiments, the determined track tension is compared to an allowable track tension range. In such an embodiment, the track tension may only be output (e.g., as an alert) responsive to the determined track tension being outside of the allowable track tension range.

In some embodiments, the controller 402 may be configured to compare the extension measurement 404 to a predetermined extension threshold to determine if the track-adjust mechanism is in an 204 overextension condition. In embodiments with a twist resistor 306, the frame assembly 104 may experience increased wear or potential for damage when operated in an overextension condition. Responsive to determining that the extension measurement 404 exceeds the predetermined extension threshold, the controller 402 may output an overextension signal, similar to the track tension signal 412. The overextension signal may cause a warning light to display at the operator station, cause an audible alarm to sound at a location of the track-adjust mechanism 322 adjustment point, or send an alert to a remote party to indicate that the track-adjust mechanism 322 is in an overextension condition.

In some embodiments, the controller 402 is configured to detect a measurement sequence that is based in part on the drive signal 410. The tension of the track is dependent upon many different variables, including the mode of propulsion of the work machine 102 (operating forwards or backwards, power train loads as determined by an engine output or loads measured at drive shaft or in the transmission, and the like), and the slope of the ground surface 126. The controller 402 may detect the desired conditions to perform a track tension determination. In some embodiments, the work machine 102 further includes an inclinometer to determine the slope of the ground surface 126. The measurement sequence may further define a maximum slope of the ground surface 126 to satisfy the conditions to be a successful track tension determination. Responsive to detecting the measurement sequence, the controller 402 determines the track tension. In other embodiments, the controller 402 is configured to receive a slope measurement from the inclinometer and adjust a determined track tension based on the received slope measurement. In such an embodiment, the controller 402 is able to factor out the effect on track tension caused by the slope of the ground surface to determine a nominal (e.g., track tension when work machine 102 is on a level ground surface) track tension measurement.

Figure 5:
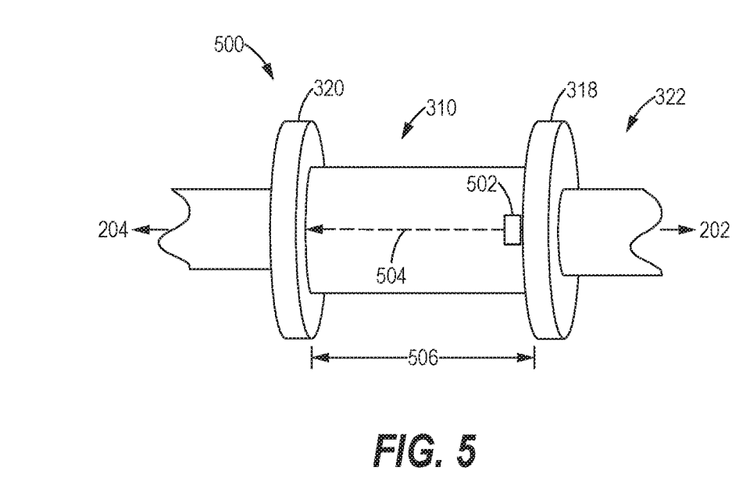
FIG. 5 is perspective view of a portion of a track-adjust mechanism having a first position sensor, in accordance with an embodiment of the present disclosure.
Figure 6:
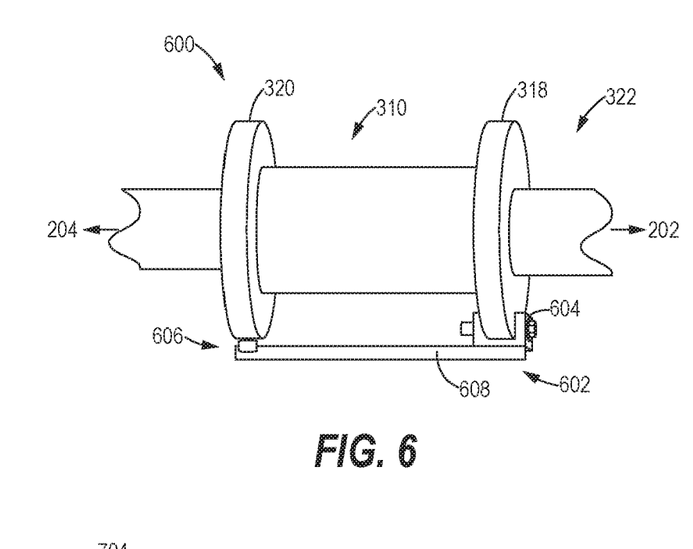
FIG. 6 is perspective view of a portion of a track-adjust mechanism having a second position sensor, in accordance with an embodiment of the present disclosure.
Figure 7:
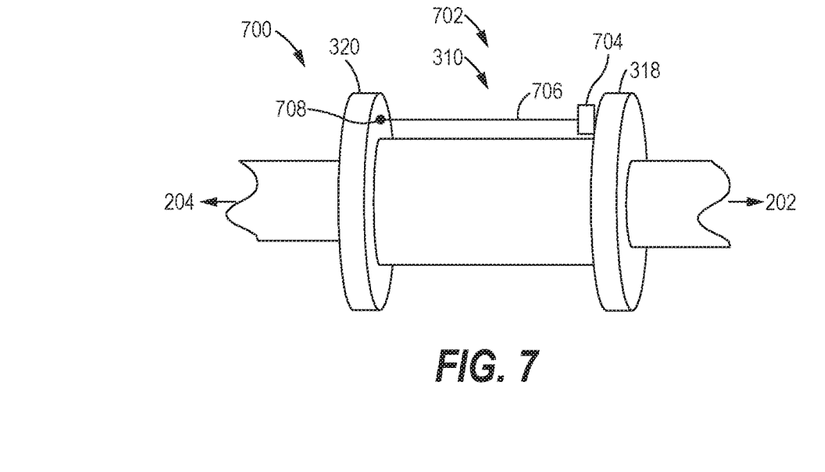
FIG. 7 is perspective view of a portion of a track-adjust mechanism having a third position sensor, in accordance with an embodiment of the present disclosure.

FIGS. 5-7 depict a plurality of different position sensors 310 installed onto a track-adjust mechanism 322. In each of the FIGS. 5-7, the front member 202 is positioned on the right side of the figure and the rear member 204 is positioned on the left side of the figure. For reference, the distance 506 is measured between the front flange 318 and the rear flange 320 and this distance 506 may serve as the extension 308 as depicted in the view 300 of FIG. 3.

FIG. 5 is perspective view of a portion of a track-adjust mechanism having a first position sensor, in accordance with an embodiment of the present disclosure. In particular, FIG. 5 depicts the view 500 of the optical sensor 502 serving as the position sensor 310 within the track-adjust mechanism 322. The optical sensor 502 is affixed to the front flange 318 and is oriented to determine a distance 506 between the front flange 318 and the rear flange 320. This extension measurement 504, obtained by the optical sensor 502, may be provided to the controller 402 to determine the track tension.

FIG. 6 is perspective view of a portion of a track-adjust mechanism having a second position sensor, in accordance with an embodiment of the present disclosure. In particular, FIG. 6 depicts the view 600 of the position sensor 310 being a magnetic position measurement system 602. The magnetic position measurement system 602 includes an attachment point 604 that is configured to attach to a portion of the frame assembly that is fixed relative to the front member 202. An extension arm 608 extends from the attachment point 604 and includes a magnetic sensor 606 on the distal end of the extension arm 608. The magnetic sensor 606 is configured to detect a position of a portion of the frame assembly 104 that is fixed relative to the rear member 204. Here, the attachment point 604 is attached to the front flange 318 and the magnetic sensor 606 is positioned to detect the position of the rear flange 320 relative to the front flange 318. This measurement obtained by the magnetic position measurement system 602 may be provided to the controller 402 to determine the track tension.

FIG. 7 is perspective view of a portion of a track-adjust mechanism having a third position sensor, in accordance with an embodiment of the present disclosure. In particular, FIG. 7 depicts the view 700 of the position sensor 310 being a string measurement system 702. The string measurement system 702 includes a string 706 that is affixed to the rear flange 320 at the attachment point 708. The string retractor 704 is affixed to the front flange 318 and is configured to exert a tension on the string 706 to retract the string 706 into the string retractor 704. The string retractor 704 is configured to determine the extension measurement based on the length of the string 706 that is outside of the string retractor 704. This measurement obtained by the string measurement system 702 may be provided to the controller 402 to determine the track tension.

INDUSTRIAL APPLICABILITY

In general, the teachings of the present disclosure may find applicability in many industries including, but not limited to, construction, agricultural, mining, industrial, commercial, transportation, or marine applications. More specifically, the teachings of the present disclosure may find applicability in any industry relying on track-type propelled machines. Example work machines 102 may include bulldozers, cranes, cold planer machines, and the like. Further, the track-type work machines may operate in a variety of ground terrain conditions that may affect the track tension in varying ways throughout the operational life of the work machine.

Figure 8:
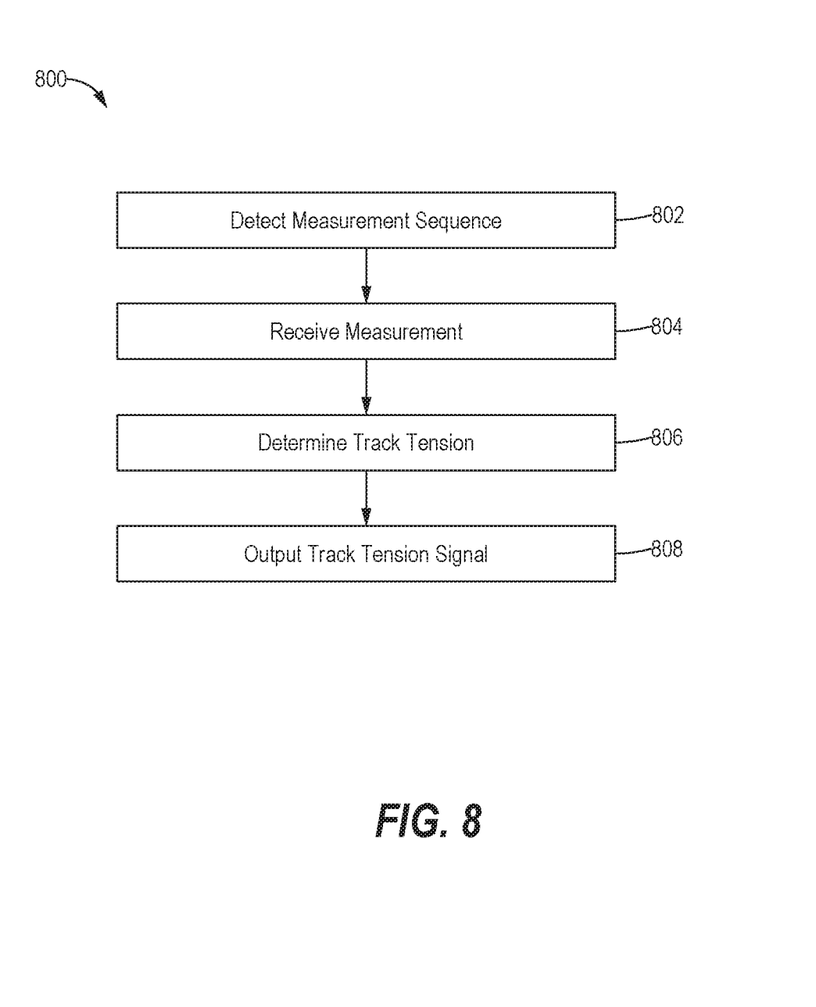
FIG. 8 is a flowchart of a series of steps that may be involved in determining a track tension, in accordance with an embodiment of the present disclosure.

FIG. 8 is a flowchart of a series of steps that may be involved in determining a track tension, in accordance with an embodiment of the present disclosure. In particular, FIG. 8 depicts the method 800 that includes detecting a measurement sequence at block 802, receiving measurements at block 804, determining a track tension at block 806, and outputting a track tension signal at block 808. Although presented in sequence, it is expected that one with skill in the art may perform the limitations of the various blocks in a different sequence than that depicted in FIG. 8.

The method 800 is used in conjunction with the track monitoring system 400 of FIG. 4 by way of an example. The track monitoring system 400 may be included on the work machine 102 of FIG. 1, although any similar track-type machine may be used. The work machine 102 may be equipped with any of the varying sensors disclosed herein. For example, the work machine 102 may include any one of or a combination of the position sensor 310, the recoil assembly tension sensor 312, and the pressure sensor 314 to determine the track tension. Further, the work machine may include any one of the various ways to output the track tension signal 412. Selection of the various sensors and methods of outputting the track tension signal may be based in part on the expected operating characteristics of the work machine 102. For example, an optical sensor 502 serving as the position sensor 310 may provide an accurate extension measurement 404. However, the optical sensor 502 may not operate as effectively in dusty work site environments, and a string measurement system 702 or a magnetic position measurement system 602 may be preferred systems for obtaining the extension measurements 404.

In an example embodiment, the work machine 102 is operating on a work site. At block 802, the controller 402 receives the drive signals 410 indicative of the operation of the drive sprocket 110. Upon detecting that the work machine 102 is in a measurement sequence, the controller 402 may then determine the track tension. In some embodiments, the prerequisite that the work machine 102 be on a level surface is included in detecting the measurement sequence.

At block 804, the controller 402 receives the measurements. For example, it may receive any one of or all of the extension measurement 404 from the position sensor 310, the recoil assembly tension measurement 406 from the recoil assembly tension sensor 312, and the track-adjust mechanism pressure measurement 408 from the pressure sensor 314. Based on any one of or a combination of these measurements, the controller 402 determines the track tension. In some embodiments, the track tension is output at all times. In other embodiments, the track tension is output only if certain conditions are met (e.g., the track tension being out of a defined range).

At block 808, the controller 402 outputs the track tension signal 412. Outputting the track tension signal 412 may cause an indication to display on an operator display 414, be transmitted via a wireless communication device 416, output a diagnostic code to 418 to a diagnostic code reader, illuminate a warning light 420, or cause the transmission of a SMS text message 422.

In some embodiments, the track tension signal may be aggregated over time to perform a longevity analysis of the undercarriage assembly 118. The aggregated track tension data may be further combined with geographic and terrain data to develop manufacturer-recommend track tension settings to improve the longevity of the undercarriage assembly 118 when operating in particular geographic areas or areas with known terrain types.

In yet other embodiments, the aggregated track tension data may be analyzed by machine learning to detect operating trends of the work machine 102 that affect the performance of the work machine 102. Updated track-tension ranges may be developed responsive to the machine learning analysis.

What is claimed is:

1. A work machine comprising:
   a frame assembly supporting an idler and a drive sprocket;
   a track looped around the idler and the drive sprocket;
   a track-adjust mechanism configured to extend and to retract the frame assembly to adjust a tension of the track;
   a position sensor configured to measure an extension of the track-adjust mechanism; and
   a controller configured to:
      receive an extension measurement from the position sensor;
      determine a track tension based on the extension measurement; and
      output a track tension signal.

2. The work machine of claim 1, further comprising:
   a recoil assembly having a recoil spring to bias against the track-adjust mechanism; and
   a recoil assembly tension sensor comprising a spring tension sensor configured to measure a recoil spring tension,
   wherein the controller is further configured to:
      receive a recoil assembly tension measurement from the spring tension sensor; and
      determine the track tension based further on the recoil assembly tension measurement.

3. The work machine of claim 1, further comprising:
   a recoil assembly having a compressed gas cylinder to bias against the track-adjust mechanism; and
   a recoil assembly tension sensor configured to measure a recoil assembly tension,
   wherein the controller is further configured to:
      receive a recoil assembly tension measurement from the recoil assembly tension sensor; and
      determine the track tension based further on the recoil assembly tension measurement.

4. The work machine of claim 1, wherein the controller is further configured to:
   compare the extension measurement to a predetermined extension threshold; and
   responsive to determining that the extension measurement exceeds the predetermined extension threshold, output an overextension signal.

5. The work machine of claim 1, further comprising a pressure sensor configured to measure a working pressure of the track-adjust mechanism;
   wherein the controller is further configured to:
      receive a track-adjust mechanism pressure measurement; and
      determine the track tension based further on the working pressure of the track-adjust mechanism.

6. The work machine of claim 1, wherein the position sensor comprises an optical sensor.

7. The work machine of claim 1, wherein the position sensor comprises a magnetic position measurement system.

8. The work machine of claim 1, wherein the position sensor comprises a string measurement system.

9. The work machine of claim 1, wherein the controller is further configured to:
   receive an indication of a drive signal to the drive sprocket;
   detect a measurement sequence based on the drive signal; and
   determine the track tension in response to detecting the measurement sequence.

10. The work machine of claim 1, further comprising an operator display, wherein outputting the track tension signal comprises displaying a track tension indication on the operator display.

11. The work machine of claim 1, wherein outputting the track tension signal comprises transmitting the track tension signal via a wireless communication device.

12. A work machine comprising:
    a frame assembly supporting an idler and a drive sprocket;
    a track looped around the idler and the drive sprocket;
    a track-adjust mechanism configured to extend and to retract the frame assembly to adjust a tension of the track;
    a recoil assembly to bias against the track-adjust mechanism;
    a recoil assembly tension sensor configured to measure a recoil assembly tension; and
    a controller configured to:
       receive a recoil assembly tension measurement from the recoil assembly tension sensor;
       determine a track tension based on the recoil assembly tension measurement; and
       output a track tension signal.

13. The work machine of claim 12, further comprising a position sensor configured to measure an extension of the track-adjust mechanism,
    wherein the controller is further configured to:
       receive an extension measurement from the position sensor; and
       determine the track tension based further on the extension measurement.

14. The work machine of claim 12, wherein the recoil assembly tension sensor comprises a spring tension sensor being a strain gage disposed on a recoil spring of the recoil assembly.

15. The work machine of claim 12, wherein the recoil assembly tension sensor comprises a load sensor disposed between the recoil assembly and the frame assembly.

16. A track monitoring system for a work machine having a track, the track monitoring system comprising a controller configured to:
    receive an extension measurement, from a position sensor, indicative of an extension of a track-adjust mechanism that extends and retracts a frame assembly to adjust a tension of the track;
    determine a track tension of the track based on the received extension measurement; and
    output a track tension signal.

17. The track monitoring system of claim 16, wherein the controller is further configured to:
    receive a recoil assembly tension measurement indicative of a recoil assembly tension to bias against the track-adjust mechanism; and
    determine the track tension based further on the recoil assembly tension measurement.

18. The track monitoring system of claim 16, wherein the controller is further configured to:
    receive an indication of a drive signal to a drive sprocket of the frame assembly;
    detect a measurement sequence based on the drive signal; and
    determine the track tension responsive to detecting the measurement sequence.

19. The track monitoring system of claim 16, wherein the controller is further configured to:
- receive a slope of a ground surface under the work machine from an inclinometer; and
- determine a corrected track tension that is the track tension corrected for effects of the slope of the ground surface on the track tension.

20. The track monitoring system of claim 16, wherein outputting the track tension signal comprises at least one of: outputting an alert responsive to determining that the track tension is out of a tension range, outputting a diagnostic code, illuminating a warning light, or outputting a Short Message Service (SMS) text message.

* * * * *